US010523474B1

(12) United States Patent
Gultekin et al.

(10) Patent No.: US 10,523,474 B1
(45) Date of Patent: Dec. 31, 2019

(54) APPROXIMATE ENUMERATIVE SPHERE SHAPING

(71) Applicant: NXP B.V., Eindhoven (NL)

(72) Inventors: Yunus Can Gultekin, Eindhoven (NL); Wim van Houtum, Sint-oedenrode (NL); Frans M. J. Willems, Geldrop (NL); Semih Serbetli, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/006,989

(22) Filed: Jun. 13, 2018

(51) Int. Cl.
  *H04B 1/10* (2006.01)
  *H04L 25/03* (2006.01)
  *H04L 27/04* (2006.01)
  *H04W 52/02* (2009.01)

(52) U.S. Cl.
  CPC .. *H04L 25/03242* (2013.01); *H04L 25/03834* (2013.01); *H04L 27/04* (2013.01); *H04W 52/0229* (2013.01)

(58) Field of Classification Search
  CPC ......... H04L 25/03242; H04L 25/03834; H04L 27/04; H04W 52/0229
  USPC ....................................................... 375/254
  See application file for complete search history.

(56) References Cited

U.S. PATENT DOCUMENTS 5,450,443 A * 9/1995 Siegel ................... H03M 5/145
    341/58

2003/0023931 A1 * 1/2003 Hwang ................. H03M 13/21
    714/792
2006/0126527 A1 * 6/2006 Cheung ................. G06Q 40/04
    370/252
2015/0380050 A1 * 12/2015 Krachkovsky ..... G11B 20/1217
    360/40
2016/0301425 A1 * 10/2016 Morero ............... H03M 13/616

OTHER PUBLICATIONS

J. Schalkwijk, "An algorithm for source coding," IEEE Transactions on Information Theory, vol. 18, No. 3, pp. 395-399, May 1972.
G. Lang and F. Longstaff, "A Leech Lattice Modem," IEEE Journal on Selected Areas in Communications, vol. 7, No. 6, (Aug. 1989).

(Continued)

*Primary Examiner* — Helene E Tayong

(57) ABSTRACT

Certain aspects of the disclosure are directed to a method for communicating data from a transmitting circuit to a receiving circuit over a noisy channel. The method can be performed by logic circuitry, and can include encoding data, for transmission over the noisy channel. The data can be encoded, as a shaped-coded modulation signal by shaping the signal based on an amplitude selection algorithm that leads to a symmetrical input and by constructing a trellis having a bounded-energy sequence of amplitude values selected by computing and storing a plurality of channel-related energy constraints based on use of a nonlinear-estimation process, and therein providing an index for the bounded-energy sequence of amplitudes. The method can also include receiving over the noisy channel, the shaped-coded modulation signal, and decoding the data from the shaped-coded modulation signal by using the index to reconstruct the bounded-energy sequence of amplitudes.

20 Claims, 4 Drawing Sheets

(56) References Cited

OTHER PUBLICATIONS

F. Willems and J. Wuijts, "A pragmatic approach to shaped coded modulation," IEEE 1st Symposium on Communications and Vehicular Technology in the Benelux (1993).
R. Laroia, N. Farvardin, and S. A. Tretter, "On optimal shaping of multidimensional constellations," IEEE Transactions on Information Theory, vol. 40, No. 4, pp. 1044-1056 (Jul. 1994).
Y. C. Gültekin, W. J. van Houtum, S. Şerbetli and F. M. J. Willems, "Constellation shaping for IEEE 802.11," 2017 IEEE 28th Annual International Symposium on Personal, Indoor, and Mobile Radio Communications (PIMRC), Montreal, QC, 2017, pp. 1-7.
ITU-T Series V: Data Communication Over the Telephone Network V.34 (Feb. 1998).
G. Böcherer, F. Steiner, and P. Schulte, "Bandwidth Efficient and Rate-Matched Low-Density Parity-Check Coded Modulation," IEEE Trans. on Commun., vol. 63, No. 12, 2015.
G. D. Forney, L. Brown, M. V. Eyuboglu, and J. L. Moran, "The v.34 high speed modem standard," IEEE Commun. Mag., vol. 34, No. 12, pp. 28-33, Dec. 1996.
K. A. S. Immink, "A practical method for approaching the channel capacity of constrained channels," IEEE Trans. on Inf. Theory, vol. 43, No. 5, pp. 1389-1399, Sep. 1997.
P. Schulte and G. Böcherer, "Constant Composition Distribution Matching," IEEE Trans. on Inf. Theory, vol. 62, No. 1, 2016.
R. F. H. Fischer, Precoding and signal shaping for digital transmission. J. Wiley-Interscience, 2002.
T. Cover, "Enumerative source encoding," IEEE Trans. on Inf. Theory, vol. 19, No. 1, pp. 73-77, Jan. 1973.
Y. C. Gültekin, W. van Houtum, S. Serbetli, and F. M. J. Willems, "Constellation Shaping for IEEE 802.11," in 2017 IEEE 28th Int. Symp. on Personal, Indoor, and Mobile Radio Commun. (PIMRC), Oct. 2017.

\* cited by examiner

APPROXIMATE ENUMERATIVE SPHERE SHAPING

OVERVIEW

Aspects of various embodiments are directed to approximate enumerative sphere shaping in data communications systems. Transmitters for wireless networks modulate carrier signals to encode information into a transmitted signal. Transmitters configured to operate in accordance with the 802.11x family of standards employ Gray-coded $2^{2m}$-QAM (quadrature amplitude modulation) constellation mapping to encode information onto carrier signals.

A typical IEEE 802.11x transmitter comprises a convolution encoder, an interleaver, and a mapper. The encoder incorporates an error-correcting code into an input signal, the interleaver permutes the coded bits in a pre-determined way, and the mapper maps the interleaved bits to symbols in the constellation diagram for modulating the transmission signal.

A new standard, IEEE 802.11p, has recently been defined. This standard is designed for vehicular networks, where the density of users will be high. Consequently, it is desirable to reduce the transmit power of signals, to minimize interference in the dense user environment.

In conventional IEEE 802.11x transmitters, symbols are selected with equal probability from within a hypercube in a constellation diagram. Selecting symbols this way is not energy efficient, and transmission does not reach the channel capacity. For vehicle networks in particular, where the density of users is expected to be high, lower transmit power levels are required to reduce interference. The energy inefficient symbol selection of conventional IEEE 802.11x transmitters limits how low the transmit power can be. Shaping methods may be employed to select the amplitudes of the channel inputs, though implementing the shaping and deshaping algorithms requires a large amount of dedicated memory and a large number of computations in real time.

SUMMARY

Various example embodiments are directed to issues such as those addressed above and/or others which may become apparent from the following disclosure concerning communicating data over a noisy channel. Particularly, enumerative amplitude shaping is proposed to gain from the shaping gap by decreasing the average required signal energy to achieve a certain rate. In its original form, implementing the enumerative amplitude trellis and shaping/deshaping operations require a large memory and computational power which makes is hard to implement in real time. The various embodiments described herein reduce the amount of memory and computations to implement sphere shaping and deshaping.

In a more specific example embodiment, communicating data from a transmitting circuit to a receiving circuit over a noisy channel is performed by logic circuitry. The method performed by logic circuitry includes encoding data, for transmission over the noisy channel, as a shaped-coded modulation signal by shaping the signal based on an amplitude selection algorithm that leads to a symmetrical input and by constructing a trellis having a bounded-energy sequence of amplitude values selected by computing and storing a plurality of channel-related energy constraints based on use of a nonlinear-estimation process, and therein providing an index for the bounded-energy sequence of amplitudes. The method further includes receiving over the noisy channel, the shaped-coded modulation signal, and decoding the data from the shaped-coded modulation signal by using the index to reconstruct the bounded-energy sequence of amplitudes.

In another specific example embodiment, a method for communicating data for transmission from a transmitting circuit and over a noisy channel for reception and decoding by a receiving circuit is described for use in a communications system having a transmitting circuit and a receiving circuit. The method includes encoding data, for transmission over the noisy channel, as a shaped-coded modulation signal by shaping the signal based on an amplitude selection algorithm that leads to a symmetrical input, and constructing a trellis having a bounded-energy sequence of amplitude values. In this exemplary embodiment, the bounded-energy sequence of amplitude values are selected by computing and storing a plurality of channel-related energy constraints based on use of a nonlinear-estimation process.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
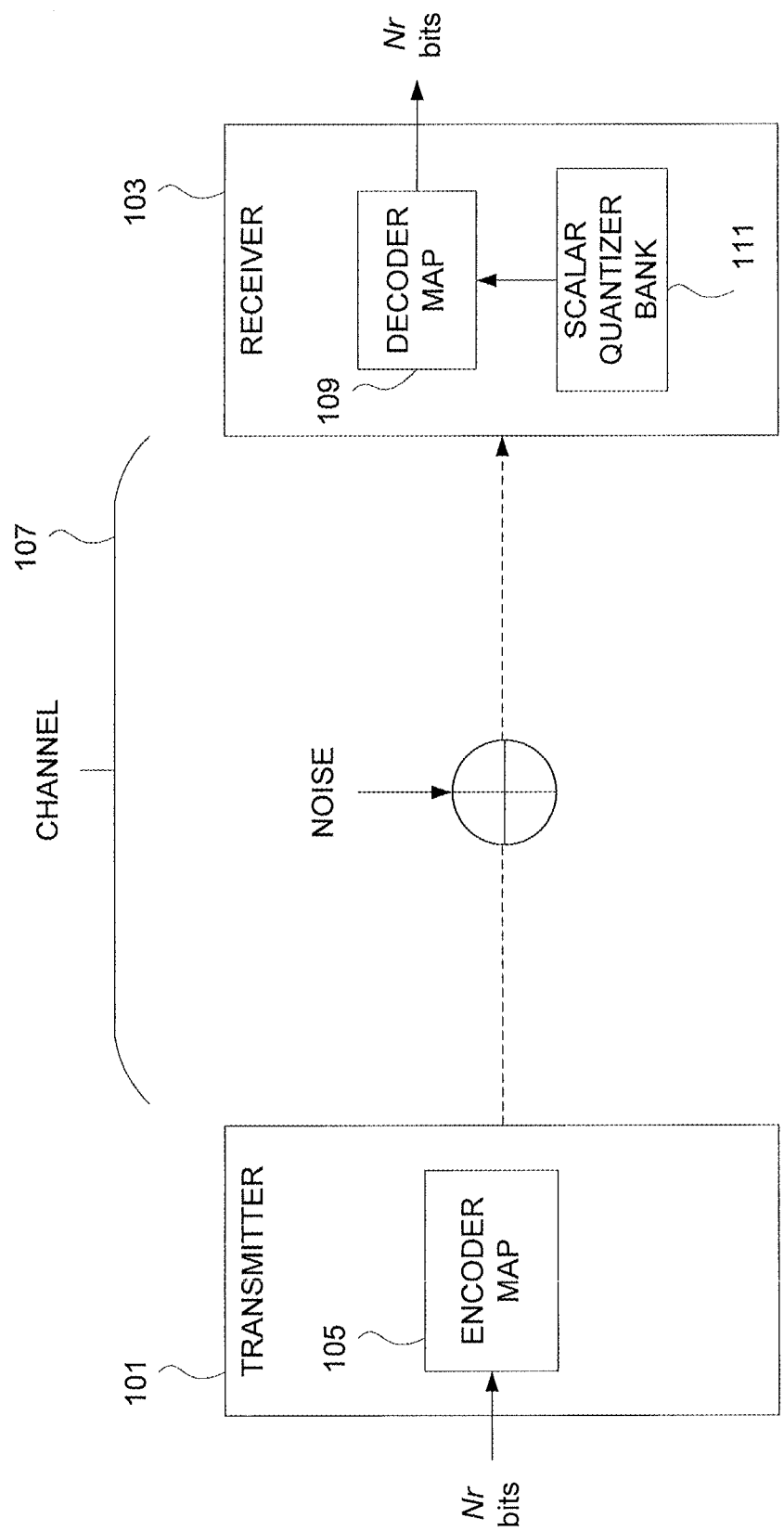
FIG. 1 is illustrates a system for transmission of data using an N-sphere SVQ-shaped cubic lattice-based constellation.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving enumerative amplitude shaping. Shaping refers to or includes optimization of a channel input with the purpose of closing the shaping gap. Most of the signal shaping methods require selection of points from an N-dimensional space, and therefore the fundamental bottleneck is the addressing complexity. Attempting to solve the addressing problem, enumerative techniques may be used in source coding, and also in shaping. As another example, shell mapping may be applied in the V.34 modem standard for N=16.

It can be shown that for an n-dimensional hypersphere, as n increases the distribution of the projection of the set of n-vectors along any axis converges to a zero-mean Gaussian distribution. Furthermore, it can be shown that the ratio of the average energy of the n-sphere to that of an n-cube having the same volume approximates 1.53 dB. Thus it is desirable to map the standard modulation points onto points on or within an n-dimensional hypersphere, yielding a Gaussian distributed channel input.

Consider transmission of N-dimensional vectors $x^N$ over an additive white Gaussian noise channel for which the capacity-achieving input distribution is Gaussian. The loss of mutual information of channel input X and output Y arising from using a uniform input distribution is called shaping gap and approaches 0.255 bits per dimension, asymptotically in block length N. This gap can also be seen as the increase in the average energy resulting from using a cubical signal structure instead of a spherical one, which is 1.53 dB asymptotically.

In accordance with the present disclosure, shaping refers to or includes a procedure to select the amplitudes of the channel inputs where the signs can be selected in any way that leads to a symmetrical input distribution, i.e., the signs are uniform. In particular, channel coding can be used for this purpose and completes the system which can be called shaped coded modulation of which a block diagram is provided in FIG. 1. The system illustrated in FIG. 1 does not employ systematic encoders and employs convolutional codes of the IEEE 802.11 system in a special manner.

Constant composition distribution matching (CCDM) may be employed as the shaping technique. CCDM represents amplitude sequences by intervals inspired by arithmetic data compression techniques. These sequences realize a fixed composition, i.e., the frequencies of the amplitudes are constant for all sequences leading to a constant composition. This method attains the capacity asymptotically in block length N. However, using all the points inside an N-sphere is more efficient for short block lengths. As an example, motivated by the number of subcarriers in the IEEE 802.11 system, N=96 may be used, and for rate R=1:75 bits per dimension that there is 0.64 dB gain of N-sphere shaping over CCDM.

FIG. 1 illustrates a system for transmission of data using an N-sphere SVQ-shaped cubic lattice-based constellation. The transmitter 101 takes a block of Nr bits from the input data stream and encodes these bits to a constellation point (N-vector) which is transmitted over a noisy channel 107. The encoding can be performed using the encoder map 105 of the transmitter 101. Such a transmitter 101 may be capable of receiving a standard IEEE 802.11x input, shaping that input to increase energy efficiency of the transmission, and transmitting a signal comprising a plurality of selected shaped symbols. In some embodiments, the transmitter 101 may be configured to operate in accordance with the IEEE 802.11x standards, or the transmitter 101 may be configured to operate in accordance with the IEEE 802.11p standard.

At the receiver 103, the channel output is first quantized, using a bank of N scalar quantizers 111, to the nearest point on the cubic lattice. This will give back the transmitted constellation point (assuming channel noise does into cause an error) which is converted to an Nr-bit block using the corresponding decoder map 109. In essence, the receiver 103 performs the reverse of the operations performed by the transmitter 101. The receiver 'de-shapes' the received signal, to extract the original data input into the transmitter. The receiver may particularly be an IEEE 802.11x receiver, or an IEEE 802.11p receiver, and may be configured to receive signals transmitted by a transmitter. As discussed further with regards to FIG. 2, the transmitter 101 may encode data for transmission over the noisy channel 207, by constructing a trellis having a bounded-energy sequence of amplitude values selected by computing and storing a plurality of channel-related energy constraints based on use of a non-linear-estimation process, and therein providing an index for the bounded-energy sequence of amplitudes. The receiver 103 may in turn receive over the noisy channel, the shaped-coded modulation signal, and decode the data by using the index to reconstruct the bounded-energy sequence of amplitudes.

Figure 2:
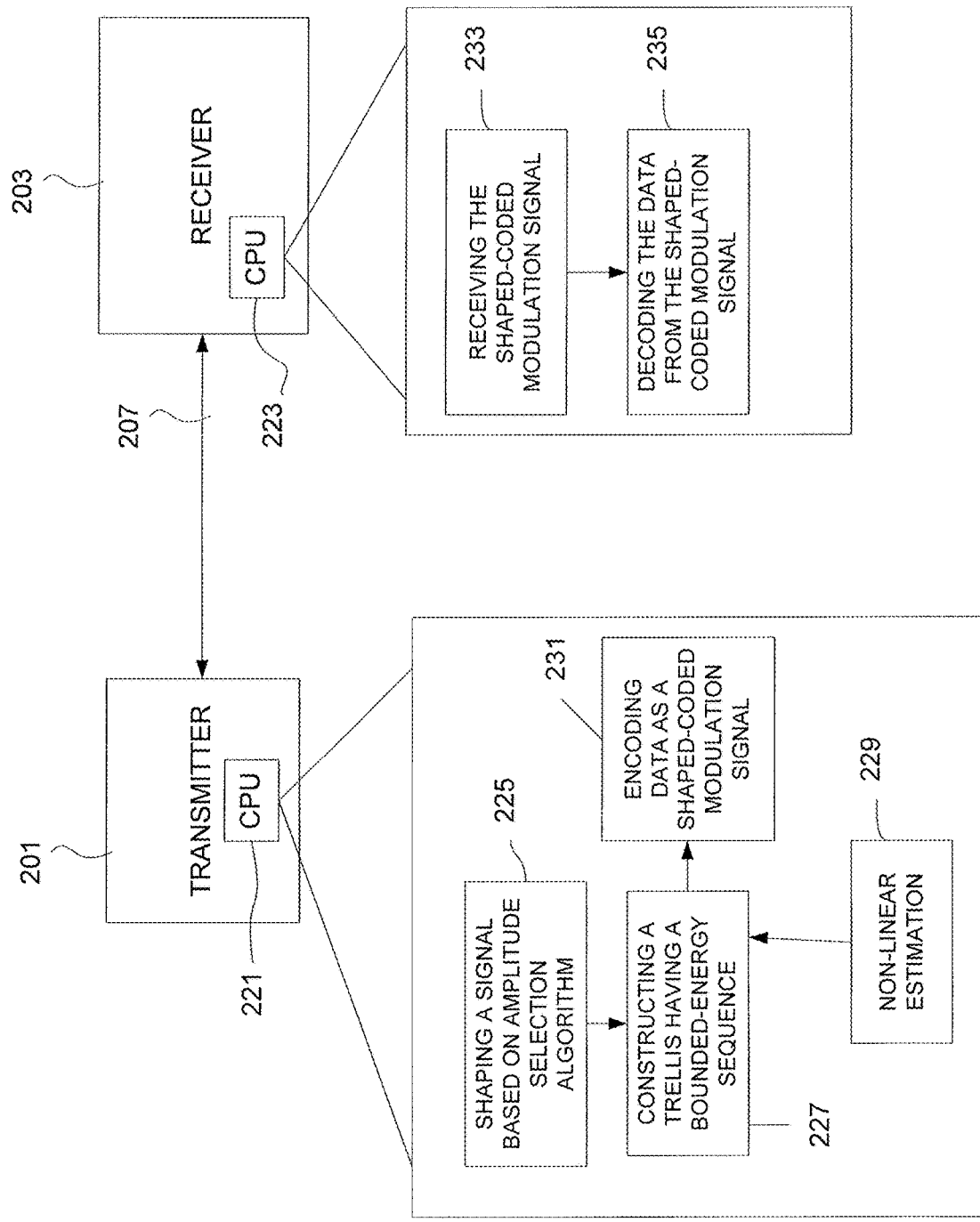
FIG. 2 illustrates an example communications system including transmitting circuitry and receiving circuitry, cooperatively programmed to communicate data over a noisy channel, in accordance with the present disclosure.

FIG. 2 illustrates a communications system including transmitting circuitry and receiving circuitry, the transmitting circuitry and the receiving circuitry being cooperatively programmed to communicate data over a noisy channel, in accordance with the present disclosure.

In example embodiments, a method for communicating data from a transmitting circuit to a receiving circuit over a noisy channel is performed by logic circuitry on a transmitter 201 and/or a receiver 203, illustrated in FIG. 2. Each of the transmitter 201 and the receiver 203 include a central processing unit (CPU) 221, 223 respectively, for performing the method. At 233, the logic circuitry (such as CPU 221) is configured and arranged to encode data, for transmission over the noisy channel 207, as a shaped-coded modulation signal. Let S be a set of bounded-energy amplitude-sequences $a^N=(a_1, a_2, \ldots, a_N) \in A^N$ of length N and let S=|S| denote the cardinality of the set. Here A={+1, +3, ..., 2|A|−1}, and the energy constraint is $$e(a^N) = \sum_{i=1}^{N} a_i^2 \leq E_{max}$$

for all $a^N \in S$. Aspects of the present disclosure are directed toward finding a one-to-one mapping from the index set I=[0, S) to S. Assuming lexicographical ordering, the enumerative approach is to derive (in an efficient way) from a sequence its index, i.e., the number of sequences in S, which are "smaller" in the lexicographical ordering. Moreover an efficient reverse operation should be specified. Since S is quite large in general, using a lookup table is infeasible. Enumerative sphere shaping in accordance with the present disclosure provides efficient recursive shaping and deshaping algorithms to reduce the memory and number of computations.

The logic circuitry can encode the data by shaping the signal based on an amplitude selection algorithm that leads to a symmetrical input, at 225, and by constructing a trellis having a bounded-energy sequence of amplitude values, at 227. The bounded-energy sequence of amplitudes can be selected by computing and storing a plurality of channel-related energy constraints based on use of a nonlinear-estimation process at 229. The logic circuitry can provide an index for the bounded-energy sequence of amplitudes.

Figure 3:
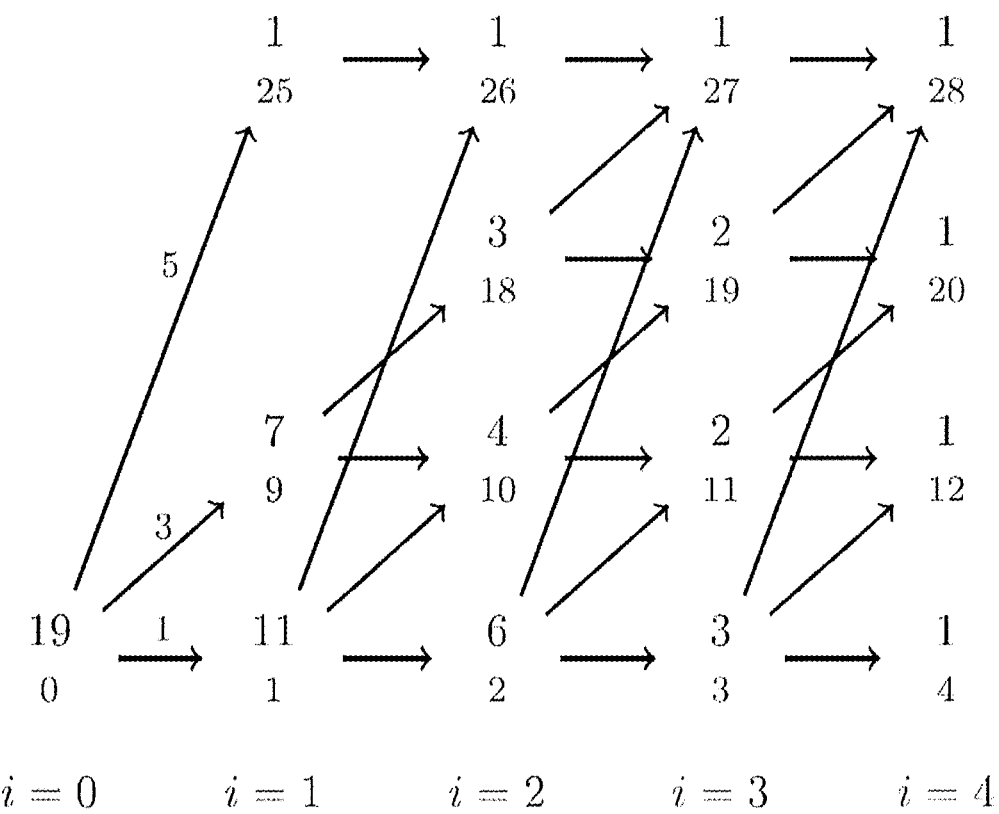
FIG. 3 illustrates an example of a trellis used by an enumeration algorithm.

To find amplitude sequences $a^N$ with $e(a^N) \leq E_{max}$, a bounded-energy trellis is constructed. As an example, as illustrated in FIG. 3, where A={1,3,5}, N=4 and $E_{max}$=28. This is equivalent to say that the 4-dimensional amplitude-sequence space is bounded by a sphere of radius $\sqrt{28}$.

In this trellis, nodes in column n, represent the accumulated energy $$e = \sum_{i=1}^{n} a_n^2,$$

which is indicated in the bottom of each respective number pair. Therefore (n, e) can be used to pinpoint a specific node where n is the corresponding column (dimension) and e the energy. The nodes in the rightmost column, column N, are called final states. Branches between states are labeled with amplitudes a∈A. Each path starting in the zero-energy node (in column 0) and ending in a final node represents an energy-bounded N-sequence.

The number written in the top of each respective number pair (n, e) is the number of possible ways to reach a final node starting from that node, and is denoted by $T_n^e$. Thus $T_0^0$ indicates the total number of sequences represented in the trellis. The information rate R corresponding to the trellis can be computed as $$R = \log_2 \frac{T_0^0}{N}$$

in bits per dimension. For this example R=1.06.

The numbers $T_n^e$ in the trellis for n=0, 1, . . . , N−1 and e≤$E_{max}$ can be computed in a recursive manner as in equation (1) below:

$$T_n^e \triangleq \Sigma_{a \in A: e+a^2 \leq E_{max}} T_{n+1}^{e+a^2} \quad (1)$$

where the initialization is:

$$T_N^e = \begin{cases} 1: & e \leq E_{max} \\ 0: & \text{otherwise} \end{cases} \quad (2)$$

In the above, only states with energy levels that are possible are considered. Possible states in column n have energy level n plus a multiple of 8, not exceeding $E_{max}$. The maximum energy can be written as $E_{max}$=N+8×(L−1) where L is the number of possible energy values in each column of the trellis. Therefore the effective number of states is L(N+1). Since the numbers in the trellis can be up to ⌈NR⌉-bits long, the memory to store the trellis is upper bounded by L(N+1)⌈NR⌉ bits.

The shaping operation maps ⌈NR⌉ bits (i.e., the base-2 representation of index I) to amplitude-sequences of length N which are ordered lexicographically assuming that 1<3< . . . <2|A|−1. An efficient way of implementing this, is formulated in an enumerative shaping algorithm (e.g., Algorithm 1).

The enumerative shaping algorithm (e.g., Algorithm 1) uses at most (|A|1) subtractions per dimension which upper bounds the number of computations by (|A|−1)⌈NR⌉ bit operations per dimension. The amplitude selection algorithm used for shaping the signal (e.g., executed at 225) includes the following enumerative shaping algorithm. Given that 0≤I<$T_0^0$, the algorithm is initialized by setting the local index $I_1$=I. Then for n=1, 2, . . . , N:

1) Take $a_n$ be such that)

$$\Sigma_{a<a_n} T_n^{e(a^{n-1},a)} \leq I_n < \Sigma_{a \leq a_n} T_n^{e(a^{n-1},a)} \quad (3)$$

2) and (for n<N)

$$I_{n+1} = I_n - \Sigma_{a<a_n} T_n^{e(a^{n-1},a)} \quad (4)$$

Finally output $a^N$.

Deshaping finds the lexicographical index J of an amplitude-sequence $a^N$. An efficient way of implementing this is formulated in the following enumerative deshaping (decoding) algorithm (e.g., Algorithm 2), below:

1) Initialize the algorithm by setting the local index $J_{N+1}$=0.
2) For n=N, N−1, . . . , 1, update the local index as:

$$J_n = \Sigma_{a<a_n} T_n^{e(a^{n-1},a)} + J_{n+1}. \quad (5)$$

3) Finally output J=$J_1$.

In some example embodiments, constructing the trellis includes storing only one column (or row) of the trellis, and storing and computing on-the-fly computation remainders ensuing from the nonlinear-estimation process for representing other parts of the trellis. Constructing the trellis includes storing less than all columns (or rows) of the trellis, and computing remainders ensuing from the nonlinear-estimation process for representing other parts of the trellis.

For instance, to decrease the amount of memory needed to store the trellis, a base-2 representation $T_n^e$=m·b $2^p$ may be used. This is a finite-precision notation where m and p are called the mantissa and power respectively, and are represented using $n_m$ and $n_p$ bits. Based on this representation, the enumerative trellis can be computed as:

$$T_n^e \triangleq \lfloor \Sigma_{a \in A: e+a^2 \leq E_{max}} T_{n+1}^{e+a^2} \rfloor_{n_m} \quad (6)$$

where $\lfloor x \rfloor_{n_m}$ means rounding x down to $n_m$ bits, so that x can be represented with a mantissa of $n_m$ bits. The result is again stored in the form (m, p). In this way, the memory is decreased from L(N+1) ⌈NR⌉ bits to L(N+1) ($n_m$+$n_p$) which is now linear in N.

The numbers in the trellis will become smaller by the rounding. In connection the efforts leading to the instant disclosure and embodiments, the inventors have surprisingly discovered that by using a nonlinear estimation method (e.g., rounding as discussed herein to save significantly on computations and memory space), the index that is input to the shaping algorithm leads to an energy-bounded sequence from which the deshaping algorithm can reconstruct the original index, using the rounded trellis. Reproducibility based on algorithm 1 and algorithm 2 is guaranteed if equation (1) is changed to:

$$T_n^e \leq \Sigma_{a \in A: e+a^2 \leq E_{max}} T_{n+1}^{e+a^2} \quad (7)$$

The proof will consist of two steps, a lemma, and a theorem. Lemma 1 is expressed as: if 0≤$I_n$<$T_{n-1}^{e(a^{n-1})}$, then Algorithm 1 guarantees that 0≤$I_{n+1}$<$T_n^{e(a^n)}$. This implies that if 0≤I<$T_0^0$, then all $I_n$ for n=1, 2, . . . , N satisfy 0≤$I_n$<$T_{n-1}^{e(a^{n-1})}$. The proof is expressed as follows:

$$0 \leq I_n < T_{n-1}^{e(a^{n-1})} \leq \sum_{a \in A: e+a^2 \leq E_{max}} T_n^{e(a^{n-1},a_k)}$$

therefore, algorithm 1 will always find an $a_n$ that satisfies equation (3). From equations (3) and (4) it is then determined that:

$$I_{n+1} = I_n - \sum_{a<a_n} T_n^{e(a^{n-1},a)} < \sum_{a \leq a_n} T_n^{e(a^{n-1},a)} - \sum_{a<a_n} T_n^{e(a^{n-1},a)} = T_n^{e(a^{n-1},a_n)}.$$

-continued $$I_{n+1} = I_n - \sum_{a<a_n} T_n^{e(a^{n-1},a)},$$

$$\geq \sum_{a\leq a_n} T_n^{e(a^{n-1},a)} - \sum_{a<a_n} T_n^{e(a^{n-1},a)} = 0.$$

Algorithms 1 and 2 guarantee that a local index $0 \leq I_n < T_{n-1}^{e(a^{n-1})}$ in state $(n-1, e(a^{n-1}))$ for $n=1, 2, \ldots, N$ results in a sequence $a_n, a_{n+1}, \ldots, a_N$ that has local index $J_n = I_n$.

The proof is by induction. First consider the state $(N-1, e(a^{N-1}))$ at depth $N-1$. The states at depth $N$ to which this state is connected are final states. There are at least $T_{N-1}^{e(a^{N-1})}$ such final states since equation (7) holds. Since $I_N < T_{N-1}^{e(a^{N-1})}$ there exist $I_N$ final states below the state that corresponds to $a_N$ that was chosen during shaping. These final states will lead to local index $J_N = I_N$ during deshaping. Next focus on the state $(n-1, e(a^{n-1}))$ at depth $n-1$, for $n<N$. During shaping, based on local index $I_n$, an $a_n$ was chosen and resulted in next local index $I_{n+1}$. The induction hypothesis now tells that in state $(n, e(a_n))$, the corresponding sequence $a_{n+1}, a_{n+2}, \ldots a_N$ will lead to an local index $J_{n+1} = I_{n+1}$. Therefore the sequence $a_n, (a_{n+1}, a_{n+2}, \ldots, a_N)$, by equation (5), and then by equation (4), leads to:

$$J_n = I_n - \sum_{a<a_n} T_n^{e(a^{n-1},a)} + J_{n+1}$$

$$= I_n - \sum_{a<a_n} T_n^{e(a^{n-1},a)} + I_{n+1} = I_n.$$

In some example embodiments, the nonlinear-estimation process includes rounding down of a quantity of bits in respective computations developed while performing the computing of the plurality of channel-related energy constraints. A sliding-window coding algorithm based on the nonlinear-estimation process may be utilized. The step of encoding 231 includes using a sliding-window algorithm based on the nonlinear-estimation process.

Optimum shaping of multidimensional constellations is discussed, where N-sequences are ordered based on their energy. Sequences of the same energy, i.e., on the same N-dimensional shell, can then be addressed in two different enumerative manners. The first manner is similar to what is discussed above, but constrained on fixed energy sequences. The trellis structure illustrated in FIG. 3 may be used, but only allowing for the final state corresponding to the shell energy E. Only for this state $T_N^E = 1$, all other final states have $T_N^e = 0$, $e \neq E$. In the second manner, sequences (having the same energy) are sorted with respect to the index of their first half, and the ones having identical first halves with respect to the index of their second half. This principle is applied recursively. Assuming that N is a power of 2, this algorithm which is called divide & conquer (D&C) uses a table with only $\log_2(N)+1$ columns. In this way, the storage complexity is decreased relative to the first manner, but at the expense of doing multiplications. The columns contain the numbers $M_n^e$ for $n \in \{1, 2, 4, \ldots, N\}$ and the relevant values of e, that are used in the enumeration processes. These are the number of n-vectors having energy e and can be computed recursively according to the equation below:

$$M_n^e = \sum_{k \leq e} M_{n/2}^k M_{n/2}^{e-k}, \quad (8)$$

where $M_1^e$ can be determined from A. Note that for $n=N$ the relevant e-value is E, and this leads to $M_N^E$.

The shaping algorithm successively divides an n-dimensional problem into two n/2-dimensional problems. At the end, the 2-dimensional mapping can be realized. An efficient way of implementing this, is formulated in a D&C shaping algorithm (e.g., Algorithm 3). Starting from the index $I_N(a^N)$, the index pointing to the desired sequence in the selected shell. The D&C shaping algorithm can be expressed as follows:

For $n=N, N/2, \ldots, 4$:

1) The energy $e_1$ of the first half $a_1^n$ of $a^n$ (and consequently the energy $e_2$ of the second half $a_2^n$) is determined by taking $$\sum_{k<e_1} M_{n/2}^k M_{n/2}^{(a^n)-k} \leq I_n(a^n) < \sum_{k \leq e_1} M_{n/2}^k M_{n/2}^{e(a^n)-k}, \quad (9)$$

and then setting $e_2 = e(a^n) - e_1$.

2) First, residual offset $D_s$ follows from:

$$D_s = I_n(a^n) - \sum_{k<e_1} M_{n/2}^k M_{n/2}^{e(a^n)-k}, \quad (10)$$

and then the local offsets $$I_{\frac{n}{2}}(a_1^n) \text{ and } I_{\frac{n}{2}}(a_2^n)$$

$$I_{\frac{n}{2}}(a_1^n) = \left\lfloor \frac{D_s}{M_{\frac{n}{2}}^{e_2}} \right\rfloor, \quad (11a)$$

$$I_{\frac{n}{2}}(a_2^n) = D_s - I_{\frac{n}{2}}(a_1^n) M_{\frac{n}{2}}^{e_2}, \quad (11b)$$

are computed.

At 233, the logic circuitry (such as CPU 223) is configured and arranged to receiving over the noisy channel 207, the shaped-coded modulation signal, and decode the data from the shaped-coded modulation signal by using the index to reconstruct the bounded-energy sequence of amplitudes at 235. The step of decoding 235 includes using a sliding-window algorithm based on the nonlinear-estimation process. In some example embodiments, the step of decoding at 235 includes using an enumerative deshaping process in which a local index of the bounded-energy sequence of amplitudes is updated for each of n different energy levels, where n is an integer.

As discussed above, deshaping finds the lexicographical index J of an amplitude-sequence $a^N$. An efficient way of implementing this is formulated in the following enumerative deshaping (decoding) algorithm (e.g., Algorithm 2), below:

1) Initialize the algorithm by setting the local index $J_{N+1} = 0$.
2) For $n=N, N-1, \ldots, 1$, update the local index as:

$$J_n = \sum_{a<a_n} T_n^{e(a^{n-1},a)} + J_{n+1}. \quad (5)$$

3) Finally output $J = J_1$.

Similar to shaping, at most $(|A|-1)$ additions per dimension are helpful for deshaping which upper bounds the number of computations by $(|A|-1) \lceil N R \rceil$ bit operations per dimension. Both for shaping and for deshaping, the trellis $T_n^e$, is be computed and stored for $n=0, 1, N$ and relevant values of e.

As discussed above, a D&C shaping algorithm may be used. Similarly, a D&C deshaping algorithm may be used. The deshaping algorithm implements the inverse mapping by successively concatenating n/2-tuples to get n-tuples and computing their offsets. At $n=N$, the index $J_N(a^n)$ is computed using two depth N/2 offsets. An efficient way of implementing this is formulated in a D&C deshaping algorithm (e.g., Algorithm 4), below:

Note that $J_1(a_1^2)=J_1(a_2^2)=0$. Now, for n=2, 4, ..., N $$D_d = J_{\frac{n}{2}}(a_1^n) M_{\frac{n}{2}}^{e(a_2^n)} + J_{\frac{n}{2}}(a_2^n), \quad (12a)$$

$$J_n(a^n) = \sum_{k<e(a_1^n)} M_{n/2}^k M_{n/2}^{e(a^n)-k} + D_d. \quad (12b)$$

Reproducibility based on Algorithms 3 and 4 is guaranteed if the trellis equation (8) is relaxed to:

$$M_n^e = \lfloor \Sigma_{k \leq e} M_{n/2}^k M_{n/2}^{e-k} \rfloor_{n_m} \leq \Sigma_{k \leq e} M_{n/2}^k M_{n/2}^{e-k}, \quad (13)$$

which will be the case when the D&C trellis is computed with bounded precision. In this way, the memory will decrease from $L(\log 2 (N)+1)\lceil NR \rceil$ to $L(\log 2 (N)+1)(n_m+n_p)$ bits.

The proof again consist of two steps, a lemma, and a theorem. Lemma 2 is expressed as: if $0 \leq I_n(a^n) < M_n^{e(a^n)}$, then the D&C shaping algorithm guarantees that $0 \leq I_{n/2}(a_i^n) < M_{n/2}^{e(a_i^n)}$ for I=1, 2. This implies that if $0 \leq I_N(a^N) < M_N^{e(a^N)}$, then all $I_n(a^N)$ for n=N/1, N/4, ..., 2 satisfy $0 \leq I_n(a^n) < M_n^e(a^n)$. The proof is expressed as follows:

$$0 \leq I_n(a^n) < M_n^{e(a^n)} \leq \sum_{k \leq e(a^n)} M_{\frac{n}{2}}^k M_{\frac{n}{2}}^{e(a^n)-k},$$

therefore algorithm 3 will always find an $e_1$ that satisfies equation (9). From equations (9) and (10) it is found that:

$$0 \leq D < M_{n/2}^{e_1} M_{\frac{n}{2}}^{e(a^n)-e_1}. \quad (14)$$

From equations (11a) and (11b), using $e_2=e(a^n)-e_1$, it is found that:

$$0 \leq I_{\frac{n}{2}}(a_1^n) < M_{n/2}^{e_1},$$

$$0 \leq I_{\frac{n}{2}}(a_2^n) < M_{n/2}^{e_2}.$$

The D&C shaping and deshaping algorithms guarantee that a local offset $0 \leq I_n(a^n) < M_n^{e(a^n)}$ for n=2, 4, ..., N results in a sequence $a^n$ that has a local offset $J_n(a^n) = I_n(a^n)$. The proof is by induction. First consider depth 2. Observe that there are at least $M_2^{e(a^2)}$ possible symbol pairs since equation (13) holds. Since $I_2(a^2) < M_2^{e(a^2)}$ there exists $I_2(a^2)$ pairs below the $a^2$ which was chosen during shaping. These pairs will lead to a local offset $J_2(a^2) = I_2(a^2)$ during deshaping. Next, focus on depth n for n>2. During shaping, based on local offset $I_n(a^n)$, an $e_1$ was chosen and results in next local offsets $I_{n/2}(a_1^n)$ and $I_{n/2}(a_1^n)$. The induction hypothesis now tells that in depth n=2, the corresponding sequences $a_1^2$ and $a_2^n$ will lead to local offsets $J_{n/2}(a_1^n)=I_{n/2}(a_1^n)$ and $J_{n/2}(a_2^n)=I_{n/2}(a_2^n)$. Therefore the sequence $a^n=(a_1^n,a_2^n)$ by equation (12), and then by (10) and (11) leads to:

$$J_n(a^n) = \sum_{k<e_1} M_{n/2}^k M_{n/2}^{e(a^n)-k} + D_d,$$

$$= \sum_{k<e_1} M_{n/2}^k M_{n/2}^{e(a^n)-k} + D_s = I_n(a^n).$$

Figure 4:
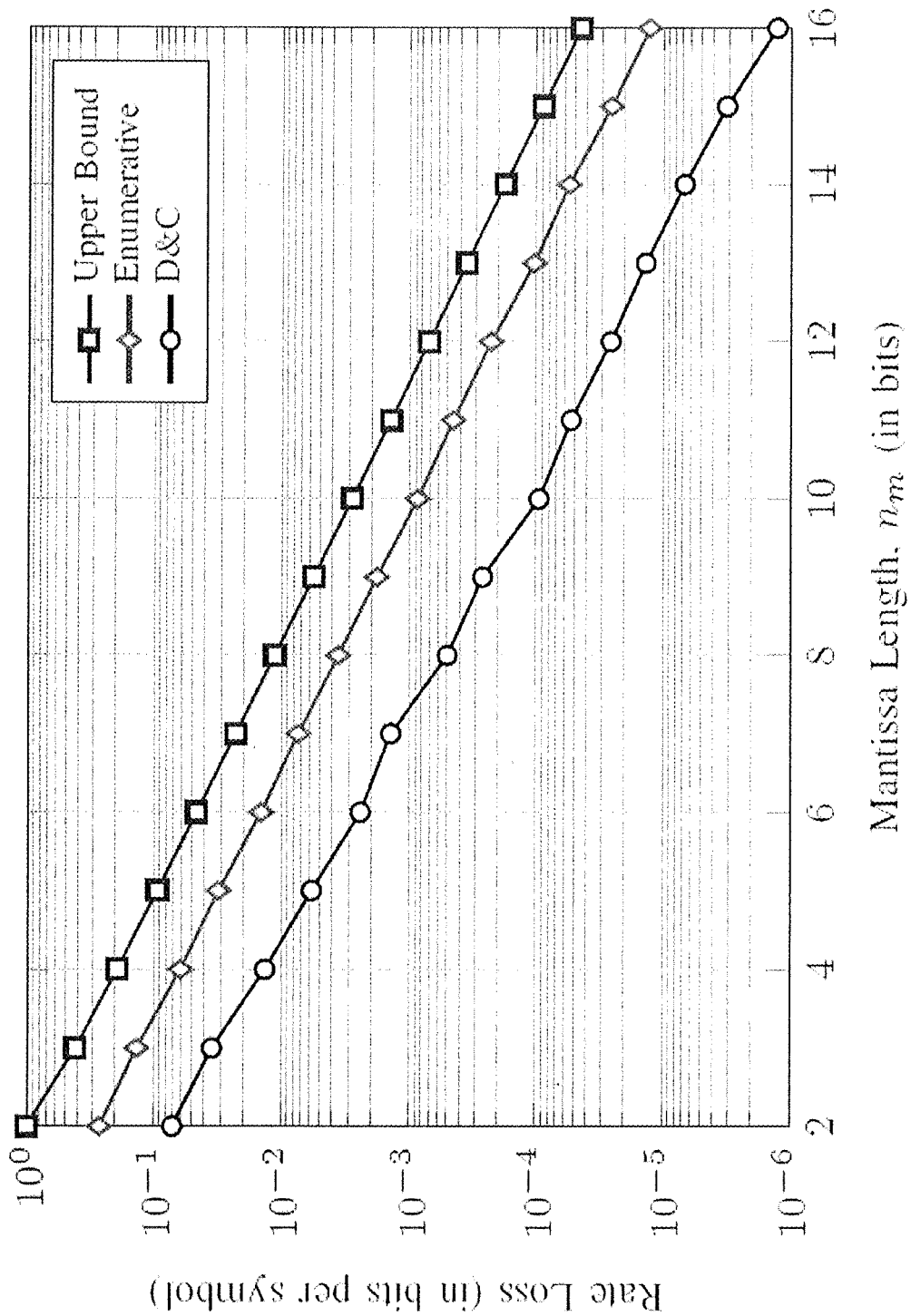
FIG. 4 illustrates rate losses induced by bounded precision, in accordance with the present disclosure.

FIG. 4 illustrates rate losses induced by bounded precision, in accordance with the present disclosure. Numbers in a bounded precision trellis are smaller than their full precision counterparts which translates to a decrease in rate. To quantify this rate loss, let $\tilde{\alpha}$ be defined as $\tilde{\alpha}=\lfloor \alpha \rfloor_{n_m}$. In the worst case, i.e., the case in which the largest possible relative error due to rounding occurs, $\tilde{\alpha}$ can be lower bounded as $\tilde{\alpha} \leq (1-\delta)\alpha$ where $\delta=2^{-(n_m-1)}$. Using this, the loss in rate of an enumerative or D&C trellis can be upper bounded.

In bounded precision enumerative trellises, $\tilde{T}_n^e \geq T_n^e(1-\delta)^{(N-n)}$ for n=0, 1, ..., N where $\tilde{T}_n^e$ denotes the trellis computed with bounded precision. The proof is by induction. First consider n=N. Since $\tilde{T}_N^e=1$ for $e \leq E_{max}$, $\tilde{T}_N^e=T_N^e$. Next focus on depth n for n<N. The induction hypothesis tells that $\tilde{T}_{n+1}^e \geq T_{n+1}^e(1-\delta)^{(N-(n+1))}$. From equation (6), the following is obtained:

$$\tilde{T}_n^e = \lfloor \Sigma \tilde{T}_{n+1}^{e+a^2} \rfloor_{n_m} \geq (1-\delta)\Sigma \tilde{T}_{n+1}^{e+a^2}$$

$$\geq (1-\delta)\Sigma (1-\delta)^{(N-n-1)} T_{n+1}^{e+a^2}$$

$$= (1-\delta)^{(N-n)} T_n^e.$$

Then the rate loss of an enumerative trellis can be upper bounded by $\log_2(T_0^0/\tilde{T}_0^0)/N \leq -\log_2(1-\delta)$ bits per dimension.

In bounded precision D&C trellises, $\tilde{M}_N^e \geq M_N^e(1-\delta)^{(n-1)}$ for n=1, 2, 4, ..., N where $\tilde{M}_n^e$ denotes the trellis computed with bounded precision. The proof is by induction. First consider n=1. By definition, $M_1^e=1$ for $e \in \{1, 9, ..., (2|A|-1)^2\}$. Thus, $\tilde{M}_1^e=M_1^e$. Next focus on depth n for $n \in \{2, 4, ..., N\}$. The induction hypothesis tells that $\tilde{M}_{n/2}^e \geq M_{n/2}^e(1-\delta)^{(n/2-1)}$. Consider from equation (13) that:

$$\tilde{M}_n^e \geq (1-\delta)\sum_{k \leq e} \tilde{M}_{n/2}^k \tilde{M}_{n/2}^{e-k} \geq (1-\delta)\sum_{k \leq e} (1-\delta)^{(n-2)} M_{\frac{n}{2}}^k M_{\frac{n}{2}}^{e-k} =$$

$$(1-\delta)^{(n-1)} M_n^e.$$

Then the rate loss of a D&C trellis can be upper bounded by $\log_2(\Sigma M_N^e/\Sigma \tilde{M}_N^e)/N \leq -\log_2(1-\delta)$ bits per dimension. Rate losses induced by bounded precision and the upper bound are shown in FIG. 4 as a function of $n_m$. In FIG. 4, N=64, L=59 and A={1, 3, 5, 7} for which the full precision rate is R=1.509. It can be deduced from FIG. 4 that a small number of bits (e.g., $n_m \approx 8$) can be used to store mantissas while the rate loss is kept smaller than $10^{-2}$ bits per symbol. Since D&C computes the index of a sequence by concatenating multiple shorter sequences successively, rounding error accumulation during recursion starts later than that of enumerative shaping. Therefore the rate loss of D&C is smaller for the same $n_m$.

More Detailed and/or Experimental Embodiments

Consistent with the above-characterized embodiments, various other embodiments are contemplated. Consider the enumerative trellis for an as a matrix of size L×N where: L is the number of energy levels (i.e., rows), and N is the number of dimensions (i.e., columns). This trellis is computed by first filling the last column with 1s, and second filling the rest using the connections between the nodes and the numbers in the trellis, i.e., accumulating numbers through the trellis according to the connections. At the end, the number in a node in the trellis (matrix) represent the number of ways to terminate the trellis starting from that node (i.e., the number of sequences (paths) starting from that node).

Considering that the numbers in the trellis will be stored in the binary format as a string of bits, the inventors discovered that instead of storing these binary strings with full precision, i.e., storing each bit, only the first $n_m$ bits can be stored (first meaning the most significant). This means the number is reduced by the amount which was represented by the bits after the first $n_m$. Thus the effective number of sequences (the ones that has the possibility to be outputted by the shaper) decreases. Some number of sequences are discarded since the number is not being stored completely.

Assuming that we compute the number in a node, throw away the bits after the first $n_m$ and proceed to the next node. Since numbers are computed in an accumulative way, the effect (i.e., the loss) grows as we travel through the trellis. The amount of this effect (loss) is inversely proportional to $n_m$. Since by throwing away some bits (while keeping the number of them) the numbers decrease, this corresponds to a rate loss.

Additional Detailed and/or Experimental Embodiments

Consistent with the above-characterized embodiments, various other embodiments are contemplated with regards to sliding window shaping. The shaping operation discussed in the present disclosure include a procedure to gradually break up the index I down to zero. At each dimension n for n=1, 2, ..., N, the index I is reduced by subtracting the number sequences having their first (n−1) component the same but are lexicographically smaller. The number of subtractions per dimension is therefore limited by (A−1) where A=|A| is the number of different amplitudes, i.e., the cardinality of the amplitude set A. In cases where enumerative trellis is computed using bounded precision (as described above), these operations can be implemented in a sliding manner.

Bounded precision ensures that only the first $n_m$ bits of each subtrahend will effect the result, since the remaining $n_e$ bits are zeros. Consider an index I which can be represented by $\lfloor NR \rfloor$ bits where is the rate of the trellis. Given that the mantissa of a subtrahend is shifted by $n_e$ bits to the left, the operation can be implemented by a $n_m$-bit subtraction.

Starting from the most significant end, the part of the input stream that the subtraction operates on slides gradually to the least significant end as n increases while the index diminishes. Therefore instead of implementing $\lfloor NR \rfloor$-bit subtractions at each dimension, $n_m$-bit subtractions are realized locally on the input stream. This is referred to herein as sliding window shaping for which an example follows.

Consider the bounded precision trellis $T_n^e$ given in equation (1) for A={1, 3, 5}, $n_m$=4, N=6 and L=6 (e.g., $E_{max}$=46). The number of sequences is $T_0^0$=(1001, 4) which is 144 in decimal². Thus the possible input index interval is [0, 144). Next, find the sequence corresponding to the index I=139 or equivalently the input bit stream 10001011.

The procedure starts with comparing $I_1$=10001011 with n=(1010, 3). Only the 4-bit mantissa of $T_1^1$ is enough for comparison, therefore the operation concerns only the corresponding 4-bit part of the index. This corresponding part can be found by shifting the 4-bit mantissa to the left by 3 (since its exponent is 3). Since $I_1 > T_1^1$, we subtract $T_1^1$ from $I_1$ to find the auxiliary result $I_a$=00111011. Observe that this subtraction operation is again local and 4-bits. Note that in case a borrow is needed, we know that the borrow will be at most $\log_2(A)$-bits away in the index. Now we compare $I_a$=00111011 with $T_1^9$=(1101, 2). Since $I_a > T_1^9$, we subtract $T_1^9$ from $I_a$ to find $I_a$=00000111. Finally, we compare $I_a$ with $T_1^{25}$ and see that $I_a < T_1^{25}$, and output $x_1$=5 since we are in the 3rd connection which corresponds to the amplitude 5. Setting $I_2$ to $I_a$, we repeat the same procedure for n=2 with $I_2$=00000111. With the trellis construction explained above, the numbers $T_n^e$ satisfy the following conditions:

$$T_n^e \leq T_n^{e'},$$

$$T_n^e \leq \Sigma_k T_{n+1}^{e+(ak)^2},$$

for e<e'. Therefore, $T_n^e \leq A \times T_{n+1}^{e+1}$ which implies that $T_n^e$ can be at most $\log_2(A)$ bits longer than $T_{n+1}^{e+1}$. Using the Lemma 1 discussed above, we see that $I_n$ is at most $\log_2(A)$-bits longer than $T_n^e$, which shows that during sliding, the operations can be implemented locally with bounded precision.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as modules, device, system, unit, controller, and/or other circuit-type depictions (e.g., reference numerals 221 and 223 of FIG. 2) depict a circuit as described herein. Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown in FIGS. 1 and 2. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described and illustrated with regards to FIG. 2 is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit).

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, the system illustrated in FIG. 1 may include more or fewer components than illustrated. As another example, the method steps illustrated in FIG. 2 may be performed in various orders and/or by different and/or additional components than illustrated. Such modifications do not depart from the true spirit and scope of various aspects of the disclosure, including aspects set forth in the claims.

What is claimed is:

1. A method for communicating data from a transmitting circuit to a receiving circuit over a noisy channel, the method performed by logic circuitry and comprising:
   encoding data, for transmission over the noisy channel, as a shaped-coded modulation signal by shaping the signal based on an amplitude selection algorithm that leads to a symmetrical input and by constructing a trellis having a bounded-energy sequence of amplitude values selected by computing and storing a plurality of channel-related energy constraints based on use of a nonlinear-estimation process, and therein providing an index for the bounded-energy sequence of amplitudes, wherein constructing the trellis includes storing only one column (or row) of the trellis, and storing and computing on-the-fly computation remainders ensuing from the nonlinear-estimation process for representing other parts of the trellis;
   receiving over the noisy channel, the shaped-coded modulation signal; and
   decoding the data from the shaped-coded modulation signal by using the index to reconstruct the bounded-energy sequence of amplitudes.

2. The method of claim 1, wherein the nonlinear-estimation process includes rounding down of a quantity of bits in respective computations developed while performing the computing of the plurality of channel-related energy constraints.

3. The method of claim 1, wherein the step of decoding includes using an enumerative deshaping process in which a local index of the bounded-energy sequence of amplitudes is updated for each of n different energy levels, where n is an integer.

4. The method of claim 1, wherein constructing the trellis includes storing: less than all columns (or rows) of the trellis, and computing remainders ensuing from the nonlinear-estimation process for representing other parts of the trellis.

5. The method of claim 1, further including using a sliding-window coding algorithm based on the nonlinear-estimation process.

6. The method of claim 1, wherein the step of encoding includes using a sliding-window algorithm based on the nonlinear-estimation process.

7. The method of claim 1, wherein the step of decoding includes using a sliding-window algorithm based on the nonlinear-estimation process.

8. The method of claim 1, wherein the step of encoding includes using a sliding-window algorithm based on the nonlinear-estimation process, and the step of decoding includes using a sliding-window algorithm based on the nonlinear-estimation process.

9. A communications system including transmitting circuitry and receiving circuitry, the transmitting circuitry and the receiving circuitry being cooperatively programmed to perform the method of claim 1.

10. For use in a communications system having a transmitting circuit and a receiving circuit, a method for communicating data for transmission from the transmitting circuit and over a noisy channel for reception and decoding by the receiving circuit, the method performed by logic circuitry and comprising:
    encoding data, for transmission over the noisy channel, as a shaped-coded modulation signal by:
       shaping the signal based on an amplitude selection algorithm that leads to a symmetrical input; and
       constructing a trellis having a bounded-energy sequence of amplitude values; and
    wherein the bounded-energy sequence of amplitude values is selected by computing and storing a plurality of channel-related energy constraints based on use of a nonlinear-estimation process, and wherein constructing the trellis includes storing only one column (or row) of the trellis, and storing and computing on-the-fly computation remainders ensuing from the nonlinear-estimation process for representing other parts of the trellis.

11. A transmitter programmed to perform the method of claim 10.

12. The method of claim 10, further including using a sliding-window coding algorithm based on the nonlinear-estimation process.

13. The method of claim 10, wherein the step of encoding includes using a sliding-window algorithm based on the nonlinear-estimation process.

14. A method for communicating data from a transmitting circuit to a receiving circuit over a noisy channel, the method performed by logic circuitry and comprising:
    encoding data, for transmission over the noisy channel, as a shaped-coded modulation signal by shaping the signal based on an amplitude selection algorithm that leads to a symmetrical input and by constructing a trellis having a bounded-energy sequence of amplitude values selected by computing and storing a plurality of channel-related energy constraints based on use of a nonlinear-estimation process, and therein providing an index for the bounded-energy sequence of amplitudes, wherein constructing the trellis includes storing: less than all columns (or rows) of the trellis, and computing remainders ensuing from the nonlinear-estimation process for representing other parts of the trellis;
    receiving over the noisy channel, the shaped-coded modulation signal; and
    decoding the data from the shaped-coded modulation signal by using the index to reconstruct the bounded-energy sequence of amplitudes.

15. The method of claim 14, wherein the nonlinear-estimation process includes rounding down of a quantity of bits in respective computations developed while performing the computing of the plurality of channel-related energy constraints.

16. The method of claim 14, wherein the step of decoding includes using an enumerative deshaping process in which a local index of the bounded-energy sequence of amplitudes is updated for each of n different energy levels, where n is an integer.

17. The method of claim 14, further including using a sliding-window coding algorithm based on the nonlinear-estimation process.

18. The method of claim 14, wherein the step of encoding includes using a sliding-window algorithm based on the nonlinear-estimation process.

19. The method of claim 14, wherein the step of decoding includes using a sliding-window algorithm based on the nonlinear-estimation process.

20. The method of claim 14, wherein the step of encoding includes using a sliding-window algorithm based on the nonlinear-estimation process, and the step of decoding includes using a sliding-window algorithm based on the nonlinear-estimation process.

* * * * *